US005790429A

United States Patent [19]

Baker et al.

[11] Patent Number: 5,790,429

[45] Date of Patent: Aug. 4, 1998

[54] MAIL CODING SYSTEM

[75] Inventors: Christopher A. Baker, Battleground; Donald Caddy, West Lafayette; David W. Purcell, Crawfordsville; Peter N. Baker, Lafayette; Adam W. Fleming, Otterbein; David P. Chastain, Clarks Hill, all of Ind.

[73] Assignee: M.A.I.L. Code, Inc., Battleground, Ind.

[21] Appl. No.: 610,430

[22] Filed: Mar. 4, 1996

[51] Int. Cl.$^6$ .......... B65G 15/00

[52] U.S. Cl. .......... 364/565; 364/148; 364/166; 209/546; 209/584; 209/900; 705/406; 705/410

[58] Field of Search .......... 364/565, 478.01, 364/478.03, 478.09, 478.11, 478.16, 478.18, 148, 166; 209/900, 584, 546; 705/406, 410

[56] References Cited

U.S. PATENT DOCUMENTS

| | | | |
|---|---|---|---|
| 2,912,925 | 11/1959 | Rabinow . | |
| 2,936,556 | 5/1960 | Gibson . | |
| 3,071,261 | 1/1963 | Fischer . | |
| 3,103,355 | 9/1963 | Hubbard et al. | 271/5 |
| 3,246,751 | 4/1966 | Brenner et al. . | |
| 3,368,672 | 2/1968 | Heaney et al. . | |
| 3,587,856 | 6/1971 | Lemelson . | |
| 3,625,508 | 12/1971 | Shiragal et al. | 271/34 |
| 3,977,533 | 8/1976 | Hills et al. | 214/1 |
| 4,077,620 | 3/1978 | Frank et al. | 271/10 |
| 4,175,694 | 11/1979 | Donabin | 235/475 |
| 4,275,875 | 6/1981 | Akers | 271/5 |
| 4,299,379 | 11/1981 | Preston et al. | 271/3.1 |
| 4,391,362 | 7/1983 | Spinelli | 198/444 |
| 4,561,352 | 12/1985 | Svyatsky et al. | 101/2 |
| 4,578,759 | 3/1986 | Horii | 364/478.01 |
| 4,678,175 | 7/1987 | Arldt et al. | 271/34 |
| 4,858,907 | 8/1989 | Eisner et al. | 271/124 |
| 4,921,107 | 5/1990 | Hofer | 364/478.01 |
| 5,031,223 | 7/1991 | Rosenbaum et al. | 382/1 |
| 5,042,667 | 8/1991 | Keough | 209/3.1 |
| 5,074,540 | 12/1991 | Belec et al. | 271/34 |
| 5,139,251 | 8/1992 | Ricciardi | 271/34 |
| 5,249,687 | 10/1993 | Rosenbaum et al. | 209/3.3 |
| 5,291,002 | 3/1994 | Agnew et al. | 235/375 |
| 5,292,114 | 3/1994 | McConnell | 271/34 |
| 5,295,677 | 3/1994 | Hutner | 271/11 |
| 5,420,403 | 5/1995 | Allum et al. | 235/375 |
| 5,423,527 | 6/1995 | Tranquilla | 271/10.02 |
| 5,456,457 | 10/1995 | Kerstein et al. | 271/10.07 |
| 5,475,603 | 12/1995 | Korowotny | 364/478.01 |
| 5,575,466 | 11/1996 | Tranquilla | 271/10.03 |

FOREIGN PATENT DOCUMENTS 0 584 607 A2 3/1994 European Pat. Off. .

OTHER PUBLICATIONS

*ES–2 Encoding System Brochure*; Mailcode, No Date.

*Primary Examiner*—James P. Trammell
*Assistant Examiner*—Hien Vo
*Attorney, Agent, or Firm*—Woodard, Emhardt, Naughton Moriarty & McNett

[57] ABSTRACT

A system for processing and encoding mail including a bin configured to hold mail and a transport coupled to said bin to receive mail therefrom. The transport displays multiple moving pieces of mail to an operator. The system includes a data entry device operable to enter data from mail moving on the transport and a coding device to receive mail from the conveyor. A controller is operatively coupled to the transport, data entry device, and coding device. The controller includes an address signal corresponding to at least a portion of an address of a mail piece entered with the data entry device by the operator, a routing code signal determined in accordance with the address signal, a performance signal corresponding to data entry capability of the operator, and a transport speed signal corresponding to speed of the transport. The controller adjusts speed of the conveyor as a function of the performance signal and the conveyor speed signal, and the coding device places a routing code on the mail piece in response to the routing code signal.

45 Claims, 9 Drawing Sheets

MAIL CODING SYSTEM

BACKGROUND OF THE INVENTION

The present invention relates to automated processing of mail, and more particularly relates to mail piece barcoding.

Throughout the history of the mail delivery, there has been a gradual evolution whereby the post office encourages mailers to prepare their mail in such a way as to reduce the effort required on the part of the post office for processing such mail. As an inducement to the mailer to prepare the mail in such a way so as to bring about faster mail delivery, the post office offers a postage discount to mailers for such items as presorted mail and printing of ZIP codes.

Recently, the United States Postal Service (USPS) has adopted new ZIP codes which contain more detailed destination information than the original five-digit ZIP code. One new form of ZIP code ("ZIP+4") contains an additional four digit extension which generally identifies an address within a portion of a residential block. A further enhanced ZIP code system utilizes 11-digit ZIP codes to specify a point of delivery.

Discounts are also given when the mail is marked with a barcode corresponding to the ZIP code. Barcoding enables mail sorting machines to more rapidly sort and route mail from a mailer to a receiver. The Postal Numeric Encoding Technique (POSTNET) was developed by the USPS to provide an optimized barcode system for encoding ZIP code information on mail.

Naturally, before a barcoding discount can be enjoyed, the proper barcode pattern must be placed on the mail. One type of system uses an Optical Character Reader (OCR) to input address information into a processor to determine the routing code with a look-up table. However, OCR systems are usually costly and sometimes unreliable, particularly for hand written addresses. U.S. Pat. No. 5,031,223 to Rosenbaum et al. discusses the use of OCR for mail coding and recognizes various shortcomings of OCR coding.

An alternative bar coding process involves presenting each mail piece to an operator who then reads the mail piece to determine a corresponding code and enters the code via a keyboard. One system provided to perform this process is a coding desk which transports one or more letters to the operator for stationary viewing. Typically, these letters are brought in succession to the desk by a transport system, and then halted in a stationary presentation position in front of the operator who keys-in a corresponding code.

One problem with this type of coding desk is the provision of generally complex and costly transport mechanisms for bringing a letter into a presentation position at high speed, halting it to enable reading of the address, and then accelerating it away at high speed. Furthermore, the interlude between successive mail piece transport cycles wastes valuable entry operator time.

Another frequent drawback with coding desks is that the determination and entry of a special code by the operator is often inefficient. For example, if the code on the mail piece does not correspond to a destination point (like an 11 digit ZIP code in the U.S.), then additional address information, such as the state, city, street name and street number, must often be considered by the operator to provide an appropriate coding entry.

Thus, there remains a need for a mail processing and encoding system which reduces the lapse of time between mail piece entries and improves entry efficiency.

SUMMARY OF THE INVENTION

One feature of the present invention is a process in which a number of mail pieces are displayed to an operator. Each of the mail pieces has an address with a street name and moves by the operator with a first nonzero speed. A portion of the address of a mail piece selected from the number of mail pieces is entered into a processor by the operator while the mail piece is in motion. The operator enters the portion at a first data entry rate. The portion is sufficient to assign a routing code to the mail piece and includes only part of the street name. The first nonzero speed is changed to a second nonzero speed as a function of the first data entry rate of the operator. In a variation of this feature, the second nonzero speed is determined as a function of the position of the mail piece during data entry.

Another feature of the present invention is a mail processing method of simultaneously displaying a number of mail pieces to an operator; designating a displayed mail piece; entering a portion of an address of the designated mail piece which is sufficient to assign a routing code to the mail piece and includes only a part of a street name; and prompting the operator to stop information entry when a amount of entered information from the mail piece is sufficient to assign a routing code to the mail piece. The amount is a portion of the address appearing on the mail piece.

Through one aspect of the present invention, a system for encoding mail is disclosed which includes a bin to hold mail and a transport coupled to the bin to receive mail therefrom. The transport displays multiple moving pieces of mail to an operator. The system also includes a data entry device operable to enter data from mail moving on the transport and a coding device to receive mail from the transport. A controller is operatively coupled to the transport, the data entry device, and the coding device. The controller includes an address signal corresponding to a portion of an address of a mail piece entered with the data entry device by the operator. This portion includes only a part of a street name. The controller also includes a routing code signal determined in accordance with the address signal, a performance signal corresponding to data entry capability of the operator, and a transport speed signal corresponding to speed of the transport. The controller adjusts speed of the transport as a function of the performance signal and the transport speed signal. The coding device places a routing code on the mail piece in response to the routing code signal.

Another aspect is to provide a mail encoding system with a magazine that includes an input section for holding unprocessed mail, an output section for holding processed mail, and a movable divider for adjusting the size of one of the input and output sections. This system has a first transport device to move mail from the input section to the output section. A processing station coupled to the transport is configured to present a mail piece for view by an operator and includes a data entry device for operator entry of data associated with the displayed mail piece. A coding device is disposed along the transport device for placing a routing code on the mail piece corresponding to the address. The divider is movably configured to decrease the input section size as mail is being processed and correspondingly increase space available for the output section.

Still another aspect of the present invention is a mail feeder system. This system comprises a magazine for holding a row of mail stacked on edge and a feeder. The feeder is configured to feed a mail piece leading the row, the feeder includes an endless turning belt with a moving contact face adapted to frictionally engage the mail piece for transport away from the row and a pivotable arm. The arm bears against the row in a hold position to hold the mail piece away from the face. Also, the arm selectively pivots to a feed position behind the face to facilitate feeding of the mail piece by the belt. The feeder also includes a controllable actuator to selectively move the arm between the hold and feed positions. The system has a roller positioned opposite the contact face to define a feed gap therebetween. The roller turns in the same rotational direction as the belt to discourage transport of multiple mail pieces. A conveyor with a nip aligned with the feed gap receives the mail piece after transport by the belt. A first sensor provides a detection signal corresponding to the presence of the leading piece at the conveyor. A controller is coupled to the actuator and the first sensor. This controller is responsive to a feed signal to move the arm to the feed position and is responsive to the detection signal to move the arm from the feed position to the hold position.

Accordingly, it is an object of the present invention to optimize operator performance by presenting multiple mail pieces to an operator for entry.

Another object of the present invention to more efficiently determine an appropriate routing code for a mail piece from information appearing of the face of the mail piece.

Other objects include more efficient and cost effective encoding of mail.

Further features, advantages, and objects of the present invention will be apparent from the the drawings and detailed descriptions included herein.

DESCRIPTION OF THE PREFERRED EMBODIMENT

Figure 1:
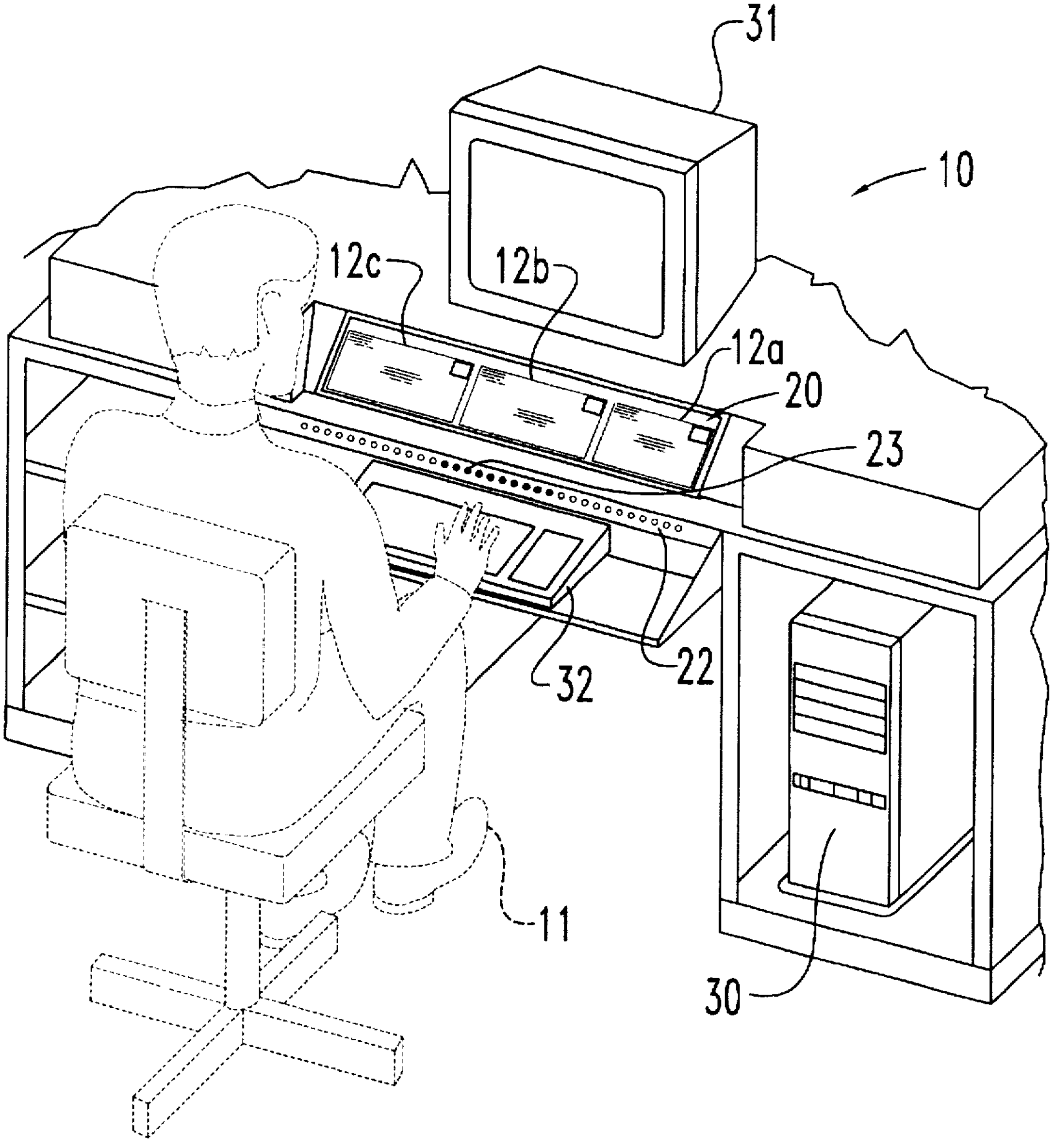
FIG. 1 is a perspective view of a mail coding station of one preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

Figure 2:
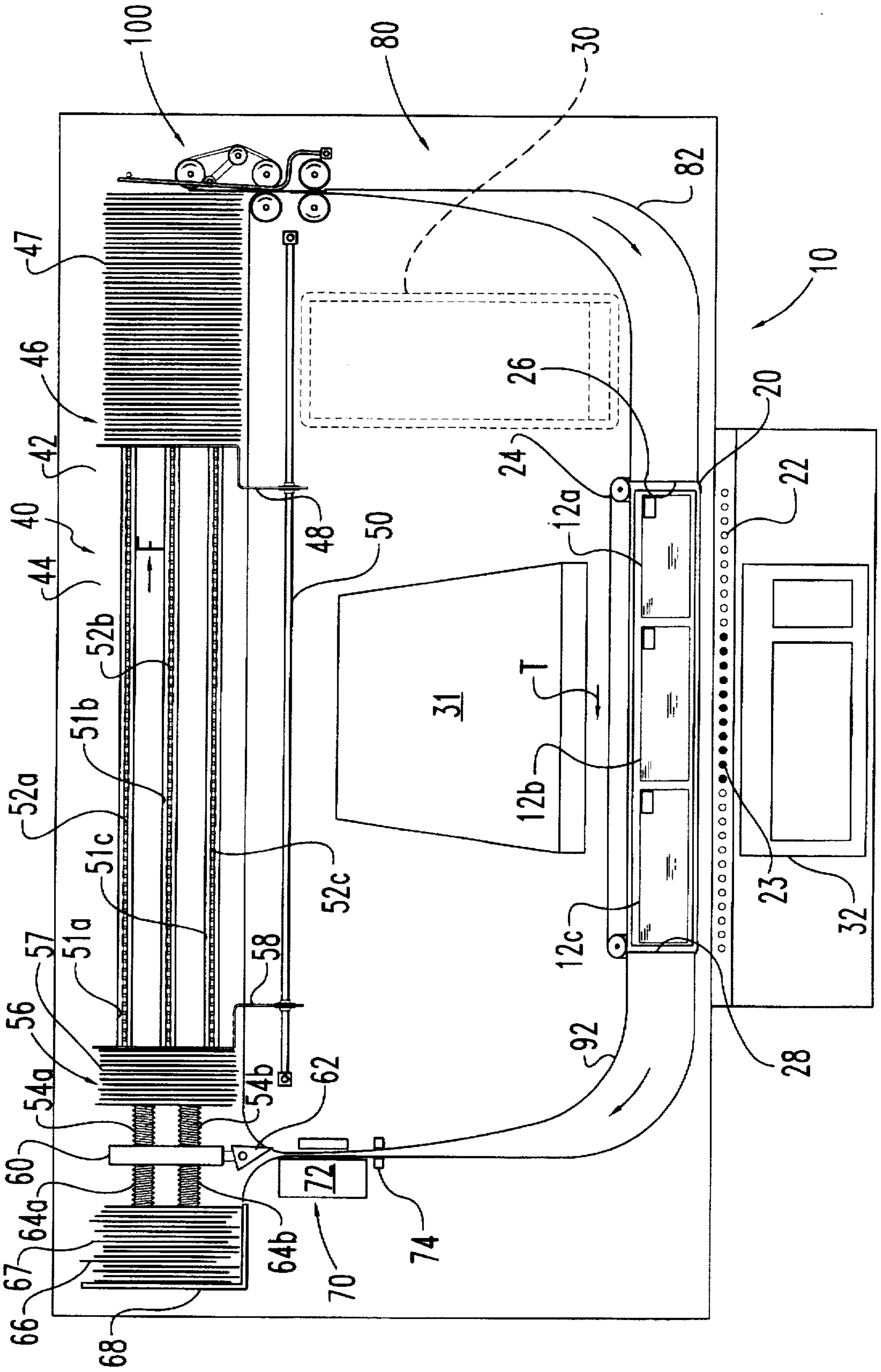
FIG. 2 is a top diagrammatic view of the embodiment shown in FIG. 1.

FIGS. 1 and 2 illustrate a mail processing station 10 of one embodiment of the present invention for operation by operator 11. As used herein, "mail" or "mail piece" includes an item entrusted with a postal service or private delivery organization for transport to a designated destination. Station 10 includes queue 20 which provides for the traveling display to operator 11 of addressed letters **12*a*, 12*b*, and 12*c*. Queue 20 has a moving display or queue transport 24 to move addressed letters entering at entry end 26 along travel path T to exit end 28. Preferably, queue 20** is about 30 inches in length to accommodate the lengthwise display of three (3) business sized envelopes at one time.

Station 10 also includes processor 30 with CRT display 31 and keyboard 32 to provide an interactive interface for operator 11. Station 10 also has transport system 80 with a magazine 40 to hold mail, feeder system 100 to deliver mail to queue 20 from magazine 40 via transport 82, queue transport 24 to move mail by the operator for viewing and entry, and transport 92 to move mail back to magazine 40. Transports 82, 92 are of a conventional type and may be belt conveyors, rollers, or another known type of mail transport device. U.S. Pat. No. 3,977,533 to Hills et al. discloses one kind of conveyor system used for coding mail.

Station 10 has indicator light row 22 which includes a number of individually controlled lights which are selectively activated to designate a mail piece for entry by an operator. In FIGS. 1 and 2, mail piece **12*b* is so designated by activated light segment 23. Preferably, individual lights of row 22 are correspondingly activated and deactivated so that activated light segment 23 remains under a designated mail piece until it is determined that entry is complete. It is preferred that light row 22** be comprised of LEDs, but other lamps or types of visual indicators are also contemplated.

Mail pieces leaving queue 20 travel by code placement system 70 before returning to magazine 40. Code placement system 70 includes print head 72 for printing a barcode on successive mail pieces which corresponds to information entered by operator 11 at queue 20 upon viewing each piece. Code placement system 70 also includes sensor 74 to detect a mail piece arriving from queue 20 via transport 92. Mail processed by code placement system 70 is returned to magazine 40 via transport 92.

Magazine 40 includes bed 42 and has a dynamically allocated bin 44 for handling mail pieces before and after coding. Bin 44 includes input section 46 holding mail row 47 of unprocessed mail stacked on edge. Push plate 48 contacts mail row 47 and maintains mail row 47.

Bed 42 defines recesses **51*a*, 51*b*, 51*c* for receiving chains 52*a*, 52*b*, 52*c*, (collectively designated chains 52), respectively. Chains 52 are configured to be moved selectively in the direction of arrow F. Details concerning the controlled movement of chains 52 are described in connection with FIGS. 7–9 and accompanying text. Push plate 48 is slideably mounted to guide bar 50 and includes teeth (not shown) which engage chains 52 to move plate 48 along with chains 52. Push plate 48 also pivots about guide bar 50 to disengage chains 52 and reposition push plate 48 along the length of chains 52. This adjustment feature accommodates different amounts of mail in input section 46. Generally, as mail is removed from input section 46 by feeder system 100 for processing, push plate 48 moves along the direction of arrow F and the size of mail row 47** decreases.

Bin 44 also includes an output section 56 opposing input section 46 for holding coded mail row 57. An end plate 58 adjustably defines an adjustable boundry of output section 56. End plate 58 engages chains 52 to correspondingly travel along path F towards feeder system 100 along with plate 48. Similarly, end plate 58 is slideably mounted to guide bar 50 and pivots about guide bar 50 to facilitate adjustment. Augers **54*a*, 54*b* move mail received in output section 56 from transport 92. Augers 54*a*, 54*b*** are of a conventional type.

Space provided by bin 44 is dynamically allocated among input section 46 and output section 56 as mail is being processed. Preferably, input section 46 decreases in size as mail is removed and output section 56 correspondingly increases in size. The common linkage of push plate 48 and end plate 58 with chains 52 help to assure that size of input section 46 and output section 56 dynamically change in accordance with the amount of mail processed. Although two plates 48, 58 are both moved to provide dynamic allocation of space provided by bin 44, it should be appreciated that a different number (more or fewer) of movable partitions or dividers may be used to accomplish the same result.

Magazine 40 also has reject bin 66 defined between partition 60 and end wall 68 for holding row 67 of rejected mail which could not be coded. Augers 64*a*, 64*b* maintain mail row 67 and are of a conventional type. Partition 60 divides reject bin 66 from bin 44. Pivotable deflector 62 is controlled to selectively direct mail from transport 92 to reject bin 66 or output section 56. In an alternative embodiment, another movable end plate is used in place of end wall 68 for reject bin 66. For this embodiment, guide bar 50 is extended over transport 92 to guide and support this additional end plate (not shown) similar to the configuration of plates 48, 58 and guide bar 50 illustrated in FIG. 2. Also, fewer augers 54*a*, 54*b*, 64*a*, 64*b* may be used in other embodiments.

Figure 3:
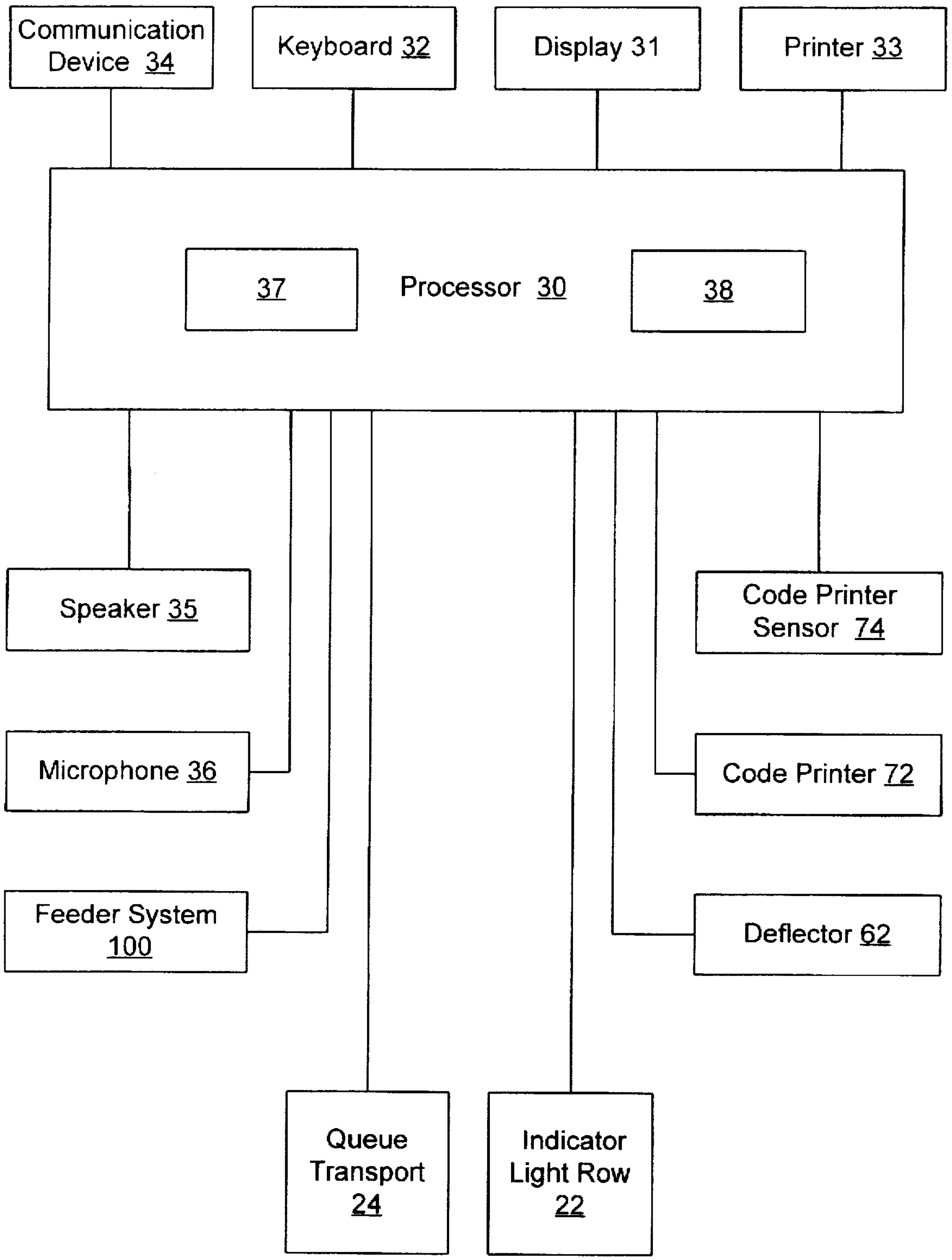
FIG. 3 is a schematic view of interfaces for the processor of the embodiment shown in FIG. 1.

Referring additionally to FIG. 3, a block diagram illustrates interfacing of processor 30 with various other components. Processor 30 is configured to initiate, monitor, and control various processes performed with station 10. Processor 30 is coupled to output devices such as display 31 and printer 33. Also, processor 30 is operatively coupled to keyboard 32 and communication device 34. By way of nonrestrictive example, communication device 34 may be a modem or a network interface. Processor 30 is also coupled to speaker 35 to provide audible prompting to an operator and microphone 36 to receive commands and process sound. Preferably, elements 31–36 are of a known type commonly used with customized processing and controlling systems.

Also, processor 30 is coupled to feeder system 100 to provide for selective feeding of mail from magazine 40 and control of chains 52. Processor 30 is controllably coupled to queue transport 24 and indicator light row 22. Processor 30 is also operatively linked to print head 72 and sensor 74 of code placement system 70. Furthermore, processor 30 is controllably linked to deflector 62.

Preferably, processor 30 has an electronic memory 37. Also, processor 30 includes a Look-Up Table (LUT) 38 configured to provide a routing code corresponding to an address entered by operator 11 with keyboard 32 when that mail piece is presented on queue 20. LUT 38 may reside in a store associated with processor 30. This store may be fixed or removable. Preferably, the store is a memory device of the electronic (e.g. solid state), magnetic, or optical variety, which may be readily updated as bar code standards or address/barcode tables change. In one embodiment, LUT 38 is provided from a remote store or other source via a communication device for processing. In this embodiment, the source and communication device are considered to be a portion of processor 30 for the purposes of the present invention.

Processor 30 may be an electronic circuit comprised of one or more components. Processor 30 may be interchangeably referenced as a controller. Processor 30 may be comprised of digital circuitry, analog circuitry, or both. Also, processor 30 may be programmable, an integrated state machine, a microprocessor, or a combination thereof. Preferably, processor 30 is a ruggedized industrial grade programmable personal computer with customized circuitry and software to interface with various components of station 10. This preferred configuration may include communication interfaces such as modem or network links, and subsystems to accommodate removable media, such as compact disks (CDs) or floppy disks.

Figure 4:
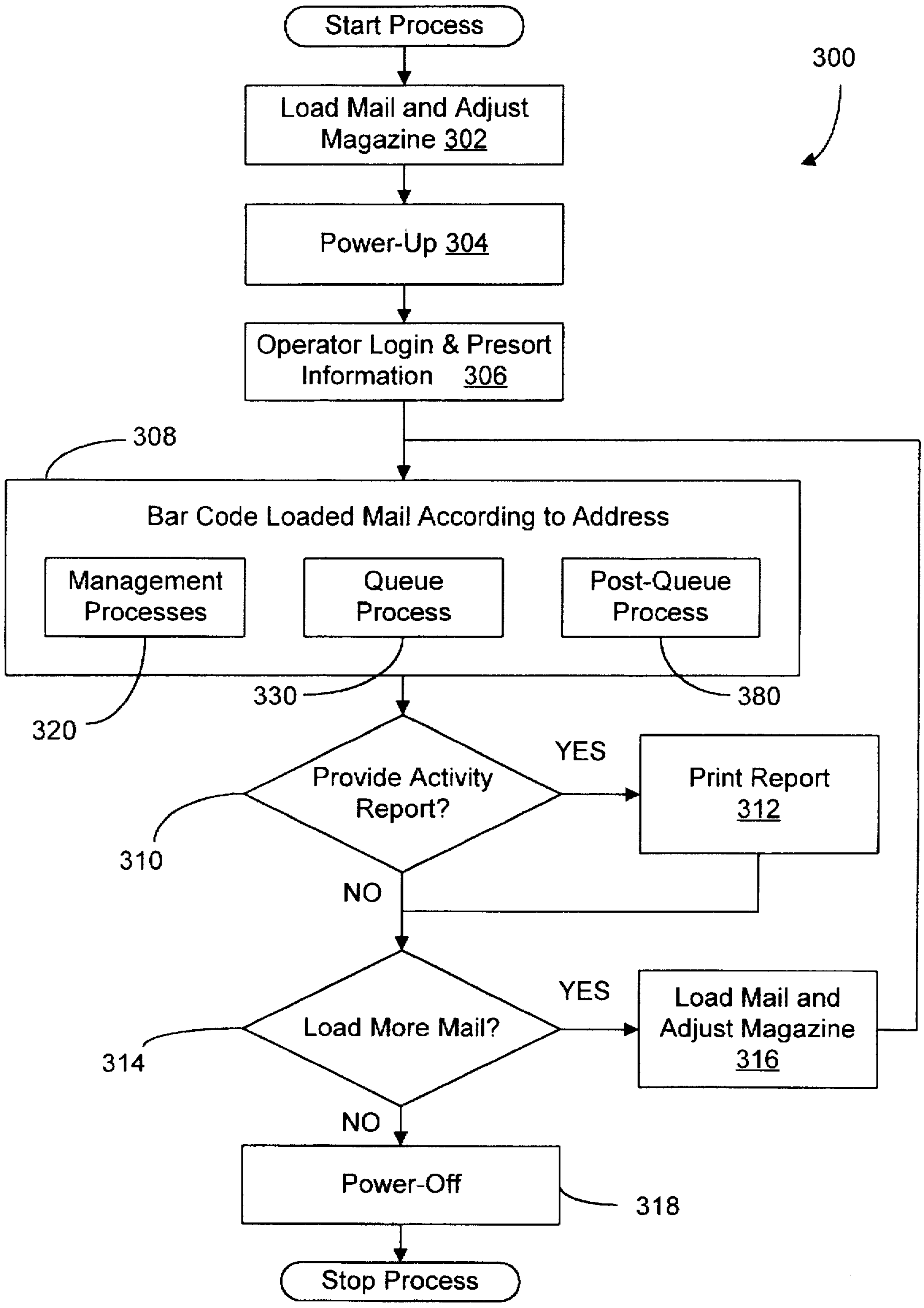
FIG. 4 is a flow diagram of one process performed with the embodiment of FIG. 1.

Referring next to FIG. 4, one preferred process 300 of the present invention using station 10 as illustrated. In step 302, an operator loads input section 46 of magazine 40 with unprocessed mail for subsequent placement of a barcode corresponding to an address on each mail piece. Push plate 48 is adjusted to maintain the mail row and apply an appropriate amount of pressure against feed system 100.

Next, in step 304, the system is powered up. Processor 30 performs various initialization routines and various motors associated with transport system 70 and magazine 40 are activated. Generally, transports 82, 92 are free running as are certain portions of feeder system 100. Alternatively, any of these free running systems may be coupled to processor 30. Such a coupling may be used to selectively activate the system, regulate the speed of the system, or detect failures or any combination of these features. For example, regulation of these devices by processor 30 may be helpful in detecting and correcting a feed jam along transport system 80.

Next, processor 30 provides for the log in of an operator in step 306. This step may also include the designation and nature of any presorting of the loaded mail which has taken place. By way of non-limiting example, one type of presort indication which may be entered is that the loaded mail all includes the same five digit ZIP code or the same state and city. After logging in, processing of mail loaded in step 302 is performed with various routines including management processes 320, queue process 330, and post-queue process 380. Management processes 320 may include routines to record various operator performance parameters; system failure monitoring—such as transport jams; prompts to the operator associated with various aspects of station 10 performance—such as audible prompts to indicate the entry of additional information or confirmation of a command. Such audible prompts are particularly advantages because an operator is not generally distracted by such a prompt from focusing on the entry of mail pieces as they travel along queue 20. Another possible management process is generating and maintaining performance statistics. Other various management processes are contemplated as would occur to one skilled in the art.

Processing of loaded mail in step 308 may include a number of routines performed in parallel or in various sequences as would occur to one skilled in the art. For an embodiment in which processor 30 is software programmable, various software routines and processes may be performed as part of step 308 which are configured for execution on a polled, interrupt, multi-tasking, or parallel basis.

After mail is processed in step 308, control flows to conditional 310 which determines if an activity report for the processed mail batch should be printed with printer 33. If a report is desired, then it is printed in step 312. Control then flows to conditional 314 to determine whether additional mail should be processed. If it is desirable to process additional mail, control flows to step 316 to prompt loading and unloading of magazine 40 before returning to the processing step 308. If no further mail processing is desired, control flows to step 318, station 10 is powered off, and routine 300 terminates.

Figure 5:
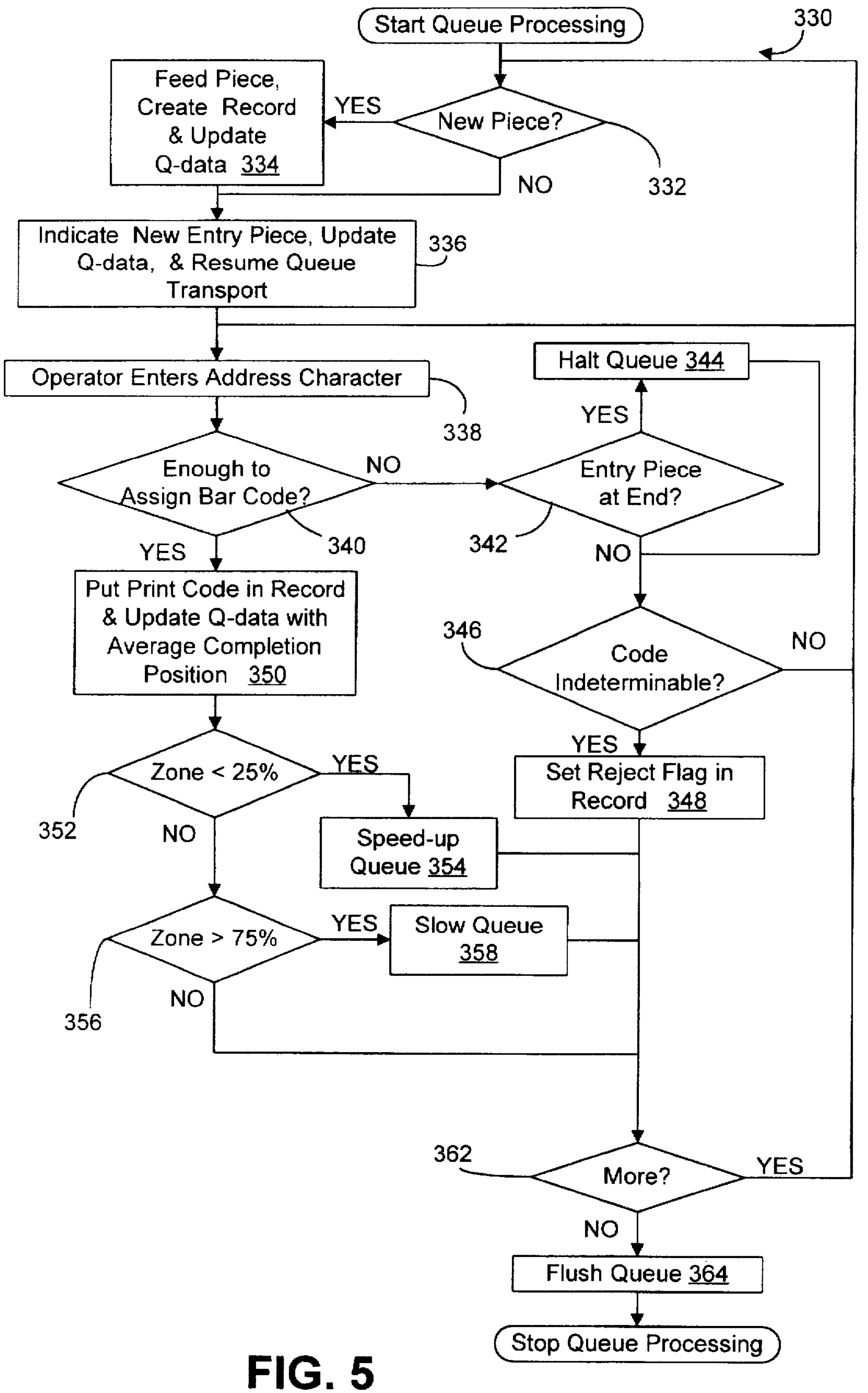
FIG. 5 is a flow diagram showing one process step of FIG. 4 in more detail.

FIG. 5 describes queue process 330. For this process, successive mail pieces are selectively sent to queue 20 from input section 46 for view by operator 11. Operator 11 reads at least part of each mail piece and enters corresponding information to determine whether a bar code can be assigned, and if so, what the proper bar code should be. Processor 30 is configured to track the number and location of each mail piece, and the status of mail piece information entry by operator 11. Pertinent information is maintained to determine an appropriate action for the mail piece during process 380.

At the beginning of process 300, conditional 332 is encountered to determine whether another mail piece needs to be added to queue 20 to maintain a steady line of successive mail pieces for entry by operator 11. This query is performed by processor 30 through reference to queue status data (Q-data) which accounts for the position, quantity, and processing/entry status of mail pieces on queue 20. If processor 30 determines that another mail piece is needed, then processor 30 sends a feed signal to feeder system 100 to initiate separation and feeding of a singulated mail piece to queue 20 via transport 82. Q-data is then updated to account for the new mail piece feed in step 334. Preferably, Q-data is maintained in electronic memory 37. Also, processor 30 generates a record for each piece of mail as it is sent to queue 20 for examination by operator 11 and maintains this record for a time; preferably in electronic memory 37. In one embodiment, at least a portion of the activity report of step 312 in process 300 is derived from these records.

Next, step 336 is reached. This step is reached when a new mail piece on queue 20 needs to be indicated for entry. Indicator light row 22 provides a convenient way for processor 30 to provide this designation. This method of mail piece designation concurrently prompts the operator to stop entry on the mail piece no longer underscored by segment 23. Q-data is correspondingly updated. Also, if for some reason queue transport 24 had been previously halted, it is resumed upon indicating a new mail piece for entry.

It should be understood that preferably, queue 20 presents a number of successive mail pieces moving at a speed selected to optimize operator performance in a direction which facilitates reading of the address. For languages where the letters of the words of an address are ordered from left to right, the optimum direction of travel for the letter is from right to left. For other languages, e.g., Arabic, the optimum direction of letter movement will be different. By controlling the speed of queue transport 24, processor 30 can maintain a speed appropriate to the operator who logged-in during step 306 of process 330.

In step 338 the operator then proceeds to sequentially enter address characters from the designated mail piece to determine a corresponding barcode using keyboard 32. Conditional 340 determines whether enough characters of the address for a designated mail piece have been entered to provide a unique corresponding barcode. Processor 30 generates an appropriate routing code upon entry of just enough characters of the mail piece address information using LUT 38 and any presorting information entered in step 306 of process 300. With this information, processor 30 is typically able to determine the appropriate barcode or routing code upon entry by the operator of only a portion of the address. To illustrate, consider the following address:

John Doe
1234 Main Street
Hometown, Homestate 99999

The street line, "1234 Main Street" includes a street number, "1234" and a street name "Main Street." Also, the city and state, "Hometown" and "Homestate," respectively, are indicated. Finally, a 5-digit ZIP code "99999" is also revealed.

To assign a suitable barcode for which a discount may be enjoyed, information in addition to that contained in some ZIP code formats (such as 5-digit ZIP codes) must be supplied by the operator. One possible approach to obtain the appropriate amount of information is to enter the entire address in sequence to provide this extra information. Another approach is to enter the deficient ZIP Code followed by the entire street number and name. However, these approaches still may result in entry of more information than needed to determine the appropriate code. Entry of this extra information is generally wasteful and reduces efficiency.

Instead, it has been found for one embodiment of the present invention that at most, the street number and only a portion of the street name need to be entered along with the deficient ZIP code to provide all the information necessary to determine a proper routing code. Notably, the minimum information required may vary in accordance with the number of entered characters of the ZIP code, street number, street name, quantity of corresponding routing codes, and address format. In one alternative embodiment, only the street number and part of the street name needs to be entered when appropriate presorting information is entered in step 306 of process 300. Address formats of some foreign countries may also be adapted for application of this aspect of the present invention.

Processor 30 and LUT 38 may be configured to determine the corresponding routing code based on a varying minimum number of corresponding keystrokes. Specifically, a string of input character for a given mail piece are accumulated until, through comparison with LUT 38, the minimum number of characters needed to assign a barcode has been entered. This determination corresponds to conditional 340. In one embodiment, the variable keystroke system begins after consecutive entry of the ZIP code, street number, and the first two characters of the street name. In another embodiment, the comparison begins after the ZIP code, street number, and three street name characters are entered. In other embodiments, station 10 may be configured to begin searching at different points.

Generally, this keystroke minimizing feature of the present invention improves coding throughput and efficiency. It can be appreciated that identifying the routing code by entry of just a portion of the address can also be used in conjunction with many different types of presorting to further improve efficiency. Notably, this keystroke reduction technique may be of particular advantage to mass mailers wanting to receive a barcode discount for a local mass mailing.

Occasionally, extra information is required to determine a proper barcode. Generally this information is needed when a secondary range—such as apartment numbers—or a secondary name—such as a particular condominium building within a complex—is needed to assign an appropriate barcode. Processor 30 and Speaker 35 may be used to audibly instruct the operator to provide this extra information as required.

Assuming enough characters have not been entered, then conditional 342 is next encountered to determine if the designated mail piece is near the end of queue 20. If the designated mail piece is near the end, then queue transport 24 is halted in step 344 to prevent inadvertent transport of the mail piece on transport 92 before processing on queue 20 is complete.

Next, conditional 346 is encountered which determines whether the designated mail piece can be assigned a code at all. In some cases a mail code may be undeterminable because the address is incomplete, illegible, or simply does not correspond to an address in LUT 38. An audible message to the operator using speaker 35 may be appropriate in this case. If the code cannot be determined, then a reject flag is set in step 348 and control flows to conditional 362 to determine if more mail is available for processing. On the other hand, if the code may still be determined, then control flows back to step 338 to acquire the next address character and sequence.

In contrast, if, at conditional 340, enough characters of the address have been entered to uniquely designate a postal barcode using LUT 38, then control flows to step 350. A print code corresponding to the unique barcode is determined and entered into the record associated with the corresponding mail piece. The position along path T of queue 20 of the mail piece upon completion of the barcode determination is used to determine an average completion zone and is maintained in Q-data. This average position or zone along queue 20 corresponds to the data entry rate of the operator and provides a measure of operator performance. Generally, the speed of queue transport 24 is maintained to provide for optimum entry efficiency of the operator. Typically, the best performance is obtained by constantly feeding mail pieces to the operator via queue 20 without substantial gaps or time periods between the pieces. Furthermore, the controlled movement of the designated mail piece along queue 20 tends to urge the operator to type at a maximum rate.

Preferably, as indicated by conditionals 352 and 356, dynamic adjustment of queue transport 24 speed is maintained so that the operator entry zone is between 25% and 75% of the length along travel path T. Specifically, if the average completion position is less than 25% as tested by conditional 352, control flows to step 354 to speed up queue transport 24. On the other hand, if the completion zone is greater than 75%, the queue transport 24 is correspondingly slowed down in step 358.

Control flows from steps 348, 354, 358 and conditional 356 to conditional 362 to determine if additional mail needs to be processed. If additional processing is needed, control returns to conditional 332. Notably, as mail pieces reach exit 28 of queue 20 which are no longer designated for entry, transport 92 automatically moves the piece to code placement system 70. If no mail is left for processing in queue 20, queue transport 24 speed is set to maximum to flush remaining pieces for further processing by routine 380. If mail is left, then control returns to conditional 332.

Figure 6:
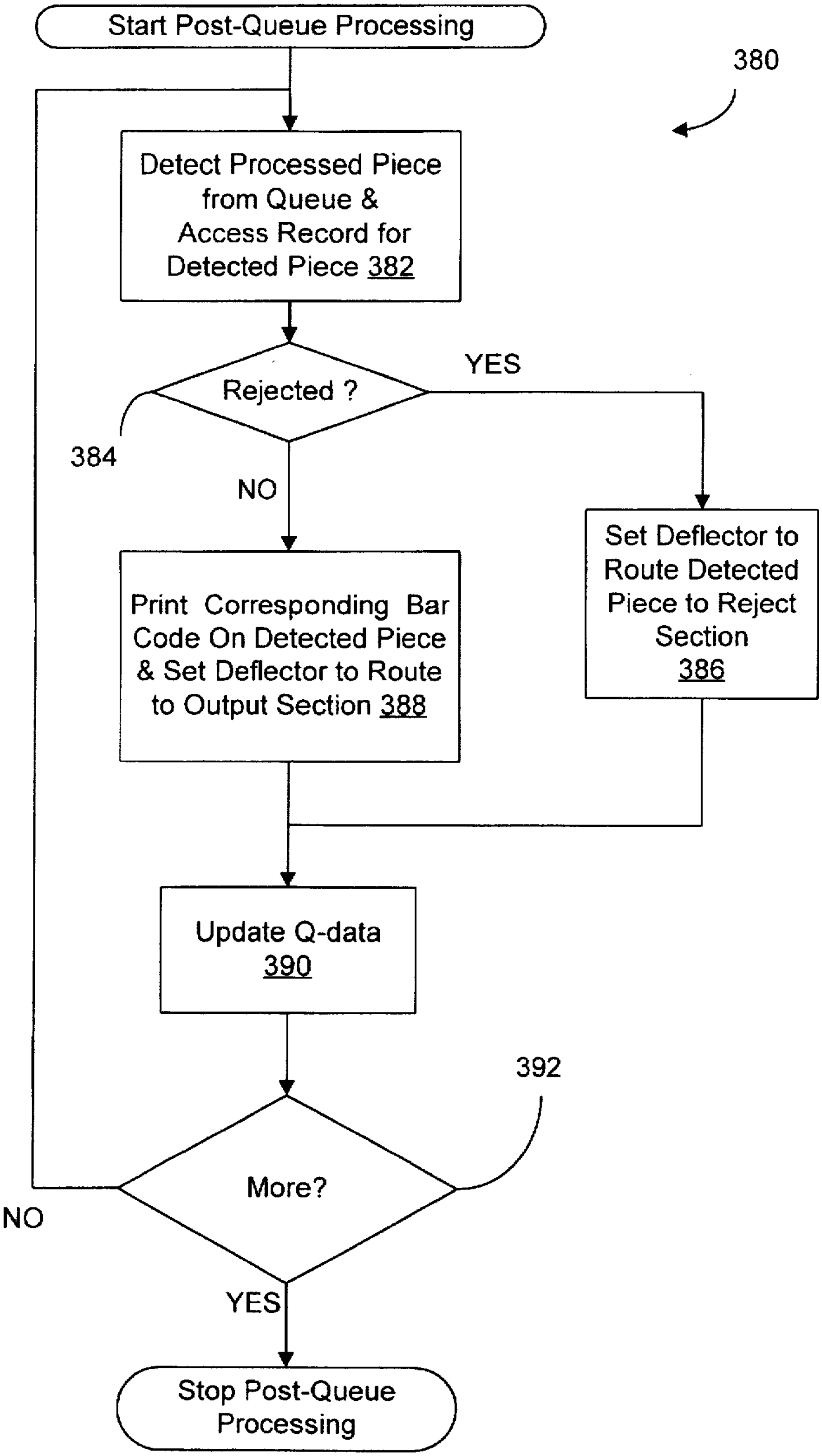
FIG. 6 is a flow diagram showing another step of FIG. 4 in greater detail.

FIG. 6 describes the post queue processing routine 380 of mail pieces as they are received from queue 20. First, sensor 74 detects the mail piece as it arrives from queue 20 and the record corresponding to the detected mail piece is accessed in step 382. If the mail piece is flagged for rejection, as determined at conditional 384, the deflector 62 is set to route the rejected mail piece to reject bin 66 in step 386.

In contrast, if a print code has been assigned, then control flows to step 388 and the corresponding barcode is printed with printer 72 on the detected mail piece. Deflector 62 is set to route the mail piece after printing to output section 56 of magazine 40. Next, in step 390, Q-data concerning status of detected and processed mail pieces is updated and conditional 392 is encountered to determine if additional mail is expected from queue 20. If mail is expected, control returns to step 382, otherwise routine 380 terminates.

In an alternative embodiment, it is possible that processor 30 could be used in conjunction with voice recognition software to translate audible signals from the operator corresponding to the content of an address as it moves along queue 20. This vocally entered address could then be converted to an appropriate signal within processor 30 to determine a corresponding barcode using LUT 38. These steps would be performed in place of an operator typing in the corresponding address with keyboard 32 in step 338. Otherwise, the processes 330 and 380 would be performed substantially the same.

Figure 7:
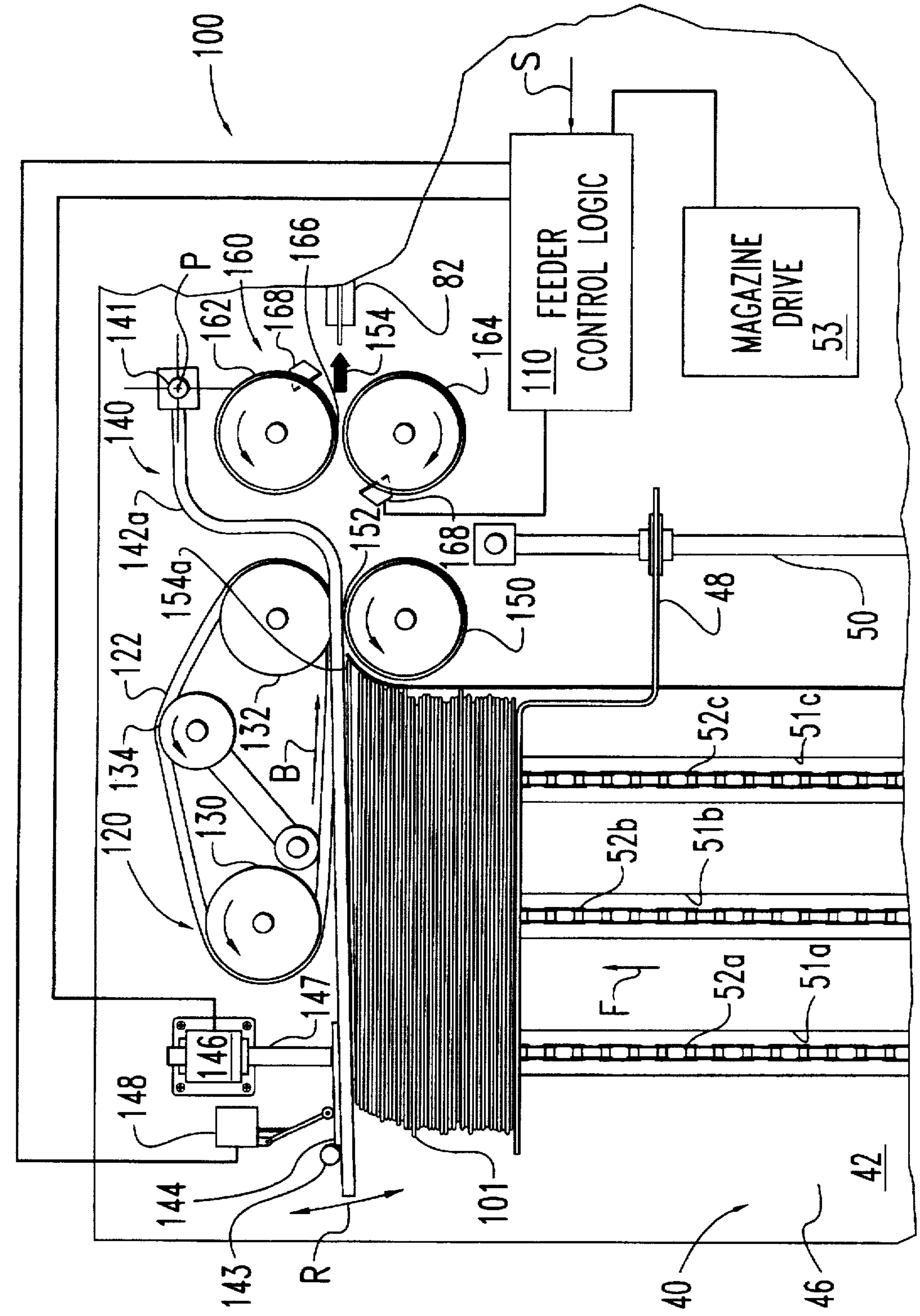
FIG. 7 is a top partial view of the feeder system of FIG. 1.
Figure 8:
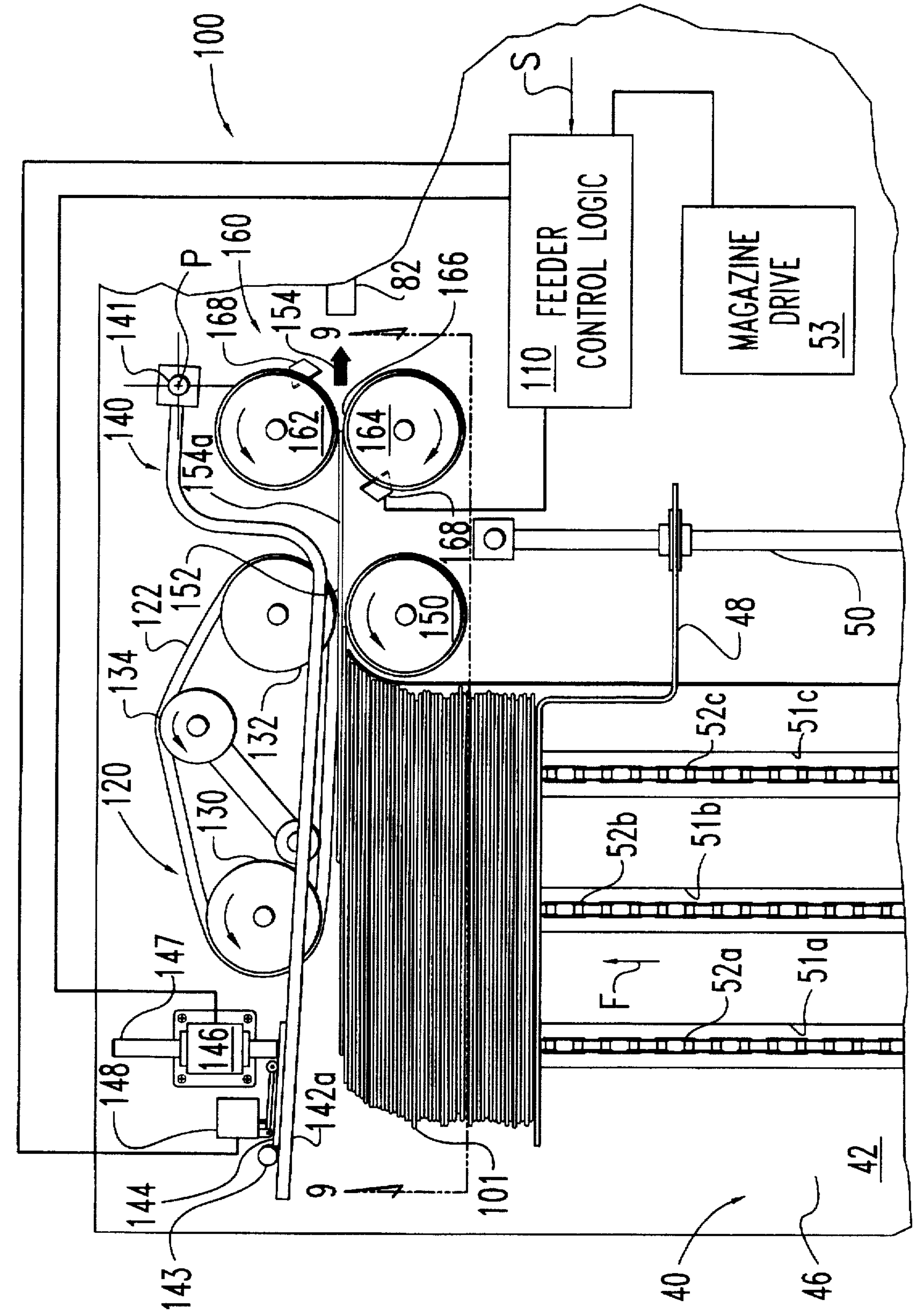
FIG. 8 is a top partial view of the feeder system of FIG. 7 in another position.
Figure 9:
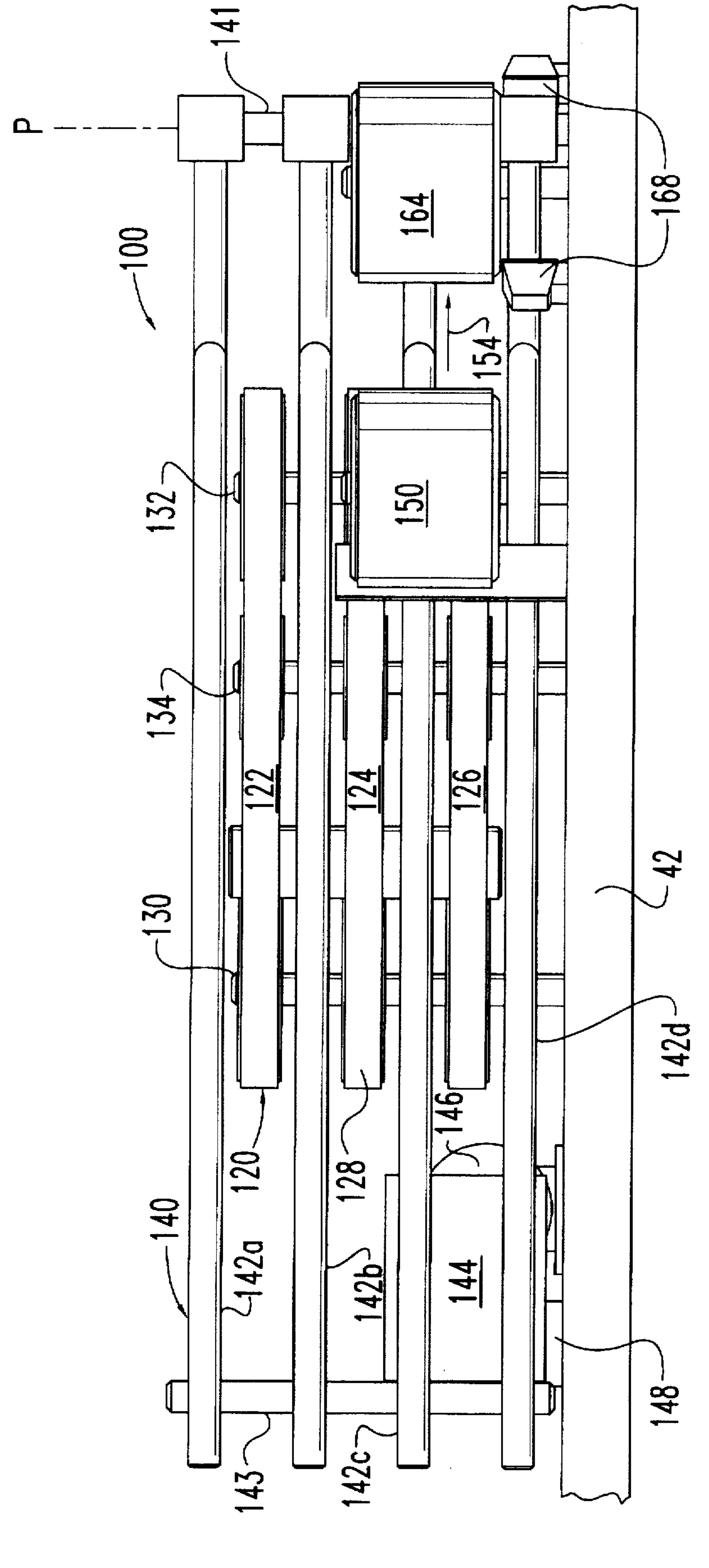
FIG. 9 is an elevational view of a portion of the feeder system shown in FIGS. 7 and 8.

Referring to FIGS. 7–9, feeder system 100 of the present invention is next described. Feeder system 100 selectively singulates and feeds mail pieces from mail row 101 to transport system 282 in response to a signal S received by feeder control logic 110. FIGS. 7 & 8 illustrate a portion of magazine 40 including input section 46 and a portion of bed 42, recesses **51*a*, 51*b*, 51*c*, and chains 52**.

Chains 52 are selectively driven in the direction of arrow F by magazine drive 53 in response to a magazine control signal from feeder control logic 110. Push plate 48 is shown engaged with chains 52 to urge mail row 101 in the direction of arrow F with a predetermined amount of pressure.

Feeder system 100 also includes endless belt system 120 with upper belt 122, middle belt 124, and lower belt 126. Together, belts 122, 124, 126 define a moving contact belt face 128 to frictionally engage a mail piece for transport. Belts 122, 124, 126 are configured to move by rotating spindles 130, 132 by a motor (not shown). Generally, belts 122, 124, 126 are rotated to move in the direction indicated by arrow B shown in FIG. 7. Also, endless belt assembly 120 includes tensioning bar and associated rollers 134. Tensioning bar and rollers 134 may be absent in other embodiments.

Feed system 100 also has a gate assembly 140 with arms **142*a*, 142*b*, 142*c*, 142*d* (collectively designated arms 142) mounted to leg 141 and cross brace 143. Cross brace 143 and leg 141 are generally positioned at opposing ends of arms 142. Gate assembly 140 also has a contact plate 144 mounted to arms 142. Arms 142 are configured to interleave with belts 122, 124, 126 as shown in FIG. 9 and pivot about axis P generally coincident with leg 141**.

Gate assembly 140 also has solenoid 146 with plunger 147 to selectively pivot arms 142 about axis P and along path R. Solenoid 146 is operatively coupled to feeder control logic 110 so that it selectively responds to a gate control signal from logic 110 to extend or retract plunger 147 (compare FIG. 6 and 7). Preferably, solenoid 146 is activated to extend plunger 147 in response to a discrete gate control signal. Besides solenoid 146, other actuators may be used such as a selectively driven motor connected to a rotating cam device. Also, a controllably rotated arm with rollers to contact plate 144 may alternatively be employed. In addition, a bell crank or crank arm may be used in conjunction with a translational or rotational device to provide an actuator suitable for gate assembly 140.

A pressure sensor 148 is associated with plate 144 to determine the amount of pressure exerted on arms 142 by mail row 101. Sensor 148 sends a corresponding pressure signal to feeder control logic 110. Preferably, pressure sensor 148 is of the microswitch variety providing a discrete digital signal corresponding to the existence of at least a predetermined level of pressure.

Roller 150 of feeder system 100 turns in a direction opposite the movement of belt contact face 128. Roller 150 is spaced apart from endless belt assembly 120 and gate assembly 140 to define a feed gap 152. Feed gap 152 is aligned with feed path 154 and nip 166 of pinch roller assembly 160.

Pinch assembly roller 160 includes pinch rollers 162, 164 to transport a mail piece to transport system 282. Pinch roller assembly 160 also includes a sensor 168 to provide a detection signal corresponding to the presence of a mail piece as it enters nip 166. Sensor 168 may be of an optical variety which sends a discrete signal corresponding to a mail piece blocking a beam of light.

Feeder system 100 operation is next discussed. Endless belt assembly 120, roller 150, and pinch roller assembly 160 are generally in free-running rotational motion, being driven by an associated driving motor (not shown) in a conventional manner. The direction of motion of various components is indicated by arrows superimposed thereon.

As shown in FIG. 7, gate assembly 140 has a hold position which presses against mail row 101 and away from endless belt assembly 120. In the hold position, plunger 147 of solenoid 146 is extended and bears against arms contact plate 144 to hold arms 142 against mail row 101. If push plate 48 is not positioned to provide adequate pressure of mail row 101 against gate assembly 140, then pressure sensor 148 sends the pressure signal to feeder control logic 110. Feeder control logic 110 responds by sending the magazine control signal to magazine drive 53 to correspondingly drive chains **52*a*, 52*b*, 52*c* to move push plate 48 along path F toward gate assembly 140 and restore adequate pressure. Once adequate pressure is obtained, the control logic 110 terminates activation of magazine drive 53**.

In response to feed signal S, feed control logic 110 sends the gate control signal to solenoid 146 to retract plunger 147. Upon retraction, gate assembly 140 changes position to selectively feed a leading mail piece **154*a* from mail row 101. Specifically, arms 142 pivot behind contact face 128 to a feed position as shown in FIG. 8**.

In the feed position, face 128 contacts lead mail piece **154*a* to frictionally transport it through feed gap 152 along feed path 154 to nip 166 of pinch roller assembly 160. As lead mail piece moves along feed path 154, roller 150 generally discourages the feeding of additional mail pieces at the same time. Roller 150 turns in the same rotational direction as endless belt assembly 120 (e.g. clockwise or counterclockwise), but the surfaces of roller 150 and belts 122, 124, 126 approach one another moving in opposite directions as the superimposed arrows indicate. The coefficient of friction of the surface of roller 150 is generally less than the surface of belts 122, 124, 126 so that lead mail piece 154a tends to move along feed path 154 even if contact with roller 150 is made. However, because the coefficient of friction between two adjacent letters is generally less than the coefficient of friction with contact face 128 or roller 150, multiple pieces fed into gap 152 at the same time typically result in the letter closest to belt contact face 128 being transported along feed path 154 with the remaining piece or pieces being transported in the opposite direction back to magazine 40 by roller 150**.

As the edge of a leading mail piece **154*a* is detected by sensor 168 of pinch roller assembly 160, the detection signal is sent to feeder control logic 110. In response, feeder control logic extends plunger 147 to return gate assembly 140 to the hold position to await another feed signal S to feeder control logic 110. Notably, as mail pieces are singulated and fed by feeder system 100, mail row 101 decreases in size and the pressure on gate assembly 140 correspondingly drops. As a result, pressure sensor 148 periodically sends a pressure signal to feeder control logic 110 to drive chains 52*a*, 52*b*, 52*c* via drive 53 to reestablish the required pressure for the functioning of feeder system 100. Notably, when all mail has been fed, sensor 168 will fail to detect an edge of a mail piece. Such repeated failures could be used to report the possibility of an empty input section 46** or another feeder problem as may be appropriate.

Feeder assembly 100 provides a cost effective means for selectively feeding mail in a barcoding application. However, feeder assembly 100 may also be used to enhance a variety of mail handling systems. Preferably, feeder control logic 110 comprises discrete logic components to provide a reliable and cost effective controller. Other controllers suitable to provide feeder control logic 110 are of the microprocessor variety. In an embodiment of station 10 using feeder system 100 in lieu of feeder 26, processor 50 may be adapted to include feeder control logic 110 using methods known to those skilled in the art.

Generally, the various steps of routines 330 and 380 correspond to signals provided by processor 30 and associated devices. The steps and conditionals in routines 300, 330, 380 may be resequenced, performed in parallel, and various steps or conditionals may be deleted, combined or added as would occur to one skilled in the art. Furthermore, sensors 74, 148, and 168 may provide a signal in either a digital or analog format. Correspondingly, the recipient controller or processor is configured to condition and convert sensor signals to the appropriate format as required. All sensors are of a known construction.

All publications, patents, and patent applications cited in this specification are herein incorporated by reference as if each individual publication, patent, or patent application were specifically and individually indicated to be incorporated by reference and set forth herein in its entirety.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of mail processing, comprising the steps of:
   (1) displaying a number of mail pieces to an operator, each of the number of mail pieces having an address with a street name, the number of mail pieces moving by the operator with a first nonzero speed;
   (2) entering a portion of the address of a mail piece selected from the number of mail pieces into a processor during performance of step (1), the operator performing step (2) at a first data entry rate, the portion being sufficient to assign a routing code to the mail piece and including only a part of the street name; and
   (3) changing the first nonzero speed of step (1) to a second nonzero speed as a function of the first data entry rate.

2. The method of claim 1, further comprising the step of referencing a data table with the processor to assign the routing code.

3. The method of claim 1, further comprising the step of printing a barcode on the mail piece corresponding to the routing code.

4. The method of claim 1, further comprising the steps of:
   (4) routing the number of mail pieces one at a time from a bin with a powered transport;

(5) placing a barcode on the mail piece corresponding to the routing code; and (6) returning the mail piece to the bin with the transport.

5. The method of claim 1, wherein the number of mail pieces is at least three and further comprising the steps of:

(4) successively designating each of the number of mail pieces for entry of a portion of the corresponding address into the processor, the portion being sufficient to assign a corresponding routing code to each of the number of mail pieces including only a part of the corresponding street name; and (5) printing a barcode on each of the number of mail pieces in accordance with the corresponding routing code.

6. The method of claim 1, wherein the operator enters another of the number of mail pieces at a second data entry rate and further comprising the step of changing the second nonzero speed to a third nonzero speed as a function of the second data entry rate.

7. The method of claim 1, wherein step (2) is performed by entering characters with a keyboard coupled to the processor.

8. The method of claim 7, wherein step (2) includes the steps of:

(2a) entering a ZIP code;

(2b) entering a street number; and (2c) entering the part of the street name, step (2c) being performed after steps (2a) and (2b).

9. A method of mail processing, comprising the steps of:

(1) simultaneously displaying a number of mail pieces to an operator;

(2) designating a mail piece displayed in step (1);

(3) entering a portion of an address of the mail piece designated in step (2), the portion being sufficient to assign a routing code to the mail piece and including only a part of a street name; and (4) prompting the operator to stop performance of step (3) upon entry of the portion.

10. The method of claim 9, further comprising the step of referencing a data table with the processor to assign the routing code.

11. The method of claim 9, further comprising the step of printing a barcode on the mail piece corresponding to the routing code.

12. The method of claim 9, further comprising the step of moving the number of mail pieces during performance of steps (1) through (4) by the operator.

13. The method of claim 9, further comprising the steps of:

(5) routing the number of mail pieces from a magazine with a singulating feeder; and (6) placing a barcode on the mail piece corresponding to the routing code; and (7) returning the mail piece to the magazine.

14. The method of claim 9, wherein step (3) is performed by entering characters with a keyboard coupled to the processor.

15. The method of claim 14, wherein step (3) includes the steps of:

(3a) entering a ZIP code;

(3b) entering a street number; and (3c) entering the part of the street name, step (3c) being performed after steps (3a) and (3b).

16. A method of mail encoding, comprising the steps of:

(1) displaying a mail piece with an address to an operator while the mail piece is moving at a first nonzero speed;

(2) entering a portion of an address of the mail piece into a processor during performance of step (1), the portion being sufficient to assign a routing code to the mail piece and including only a part of a street name; and (3) changing the first nonzero speed of step (1) to a second nonzero speed as a function of the position of the mail piece during performance of step (2).

17. The method of claim 16, further comprising the steps of:

(4) referencing a data table with the processor to assign the routing code; and (5) printing a barcode on the mail piece corresponding to the routing code.

18. The method of claim 16, further comprising the steps of:

(4) routing a number of mail pieces one at a time from a bin with a powered transport;

(5) placing a barcode on the mail piece corresponding to the routing code; and (6) returning the mail piece to the bin with the transport after performance of step (2).

19. The method of claim 16, wherein the number of mail pieces is at least three and further comprising the steps of:

(4) successively designating each of the number of mail pieces for entry of a portion of the corresponding address into the processor, the portion being sufficient to assign a corresponding routing code to each of the number of mail pieces including only a part of a corresponding street name; and (5) printing a barcode on each of the number of mail pieces in accordance with the corresponding routing code.

20. The method of claim 16, further including the step of audibly instructing the operator with the processor.

21. The method of claim 16, wherein step (2) is performed by entering characters corresponding to the address with a keyboard coupled to the processor.

22. The method of claim 21, wherein step (2) includes the steps of:

(2a) entering a ZIP code;

(2b) entering a street number; and (2c) entering the part of the street name, step (2c) being performed after steps (2a) and (2b).

23. The method of claim 16, further comprising the step of successively designating each of a number of mail pieces for entry of a portion of a corresponding address into a processor, the portion being sufficient to assign a corresponding routing code to each of the number of mail pieces including only a part of the corresponding street name.

24. A system for encoding mail, comprising:

a bin configured to hold mail;

a transport coupled to said bin to receive mail therefrom, said transport being configured to display multiple moving pieces of mail to an operator;

a data entry device operable to enter data from mail moving on said transport;

a coding device configured to receive mail from said transport;

a controller operatively coupled to said transport, said data entry device, and said coding device, said controller including:

an address signal corresponding to a portion of an address of a mail piece entered with said data entry device by the operator, the portion including only a part of a street name;

a routing code signal determined in accordance with said address signal, a performance signal corresponding to data entry capability of the operator, a transport speed signal corresponding to speed of said transport; and, wherein said controller adjusts speed of said transport as a function of said performance signal and said transport speed signal, and said coding device places a routing code on the mail piece in response to said routing code signal.

25. The system of claim 24, wherein said coding device includes a barcode printer and said data entry device includes a keyboard.

26. The system of claim 24, wherein said bin is configured to hold a row of mail stacked on edge and said transport includes a feeder configured to feed a leading mail piece from the row, said feeder including:

(a) an endless turning belt with a moving contact face adapted to frictionally engage the leading mail piece;

(b) a pivotable arm configured to bear against the row in a hold position to hold the leading mail piece away from said face and to selectively pivot to a feed position behind said face to facilitate feeding of the leading mail piece by said belt; and (c) a controllable actuator configured to selectively move said arm between said hold and feed positions.

27. The system of claim 26, wherein said transport further includes:

a roller positioned opposite said face to define a feed gap therebetween, said roller turning in the same rotational direction as said belt to discourage transport of multiple mail pieces from the row concurrently; and a conveyor with a nip aligned with said feed gap to receive the leading mail piece after transport by said belt.

28. The system of claim 24, wherein said bin includes:

an input section for holding unprocessed mail;

an output section for holding processed mail;

a movable divider for adjusting the size of at least one of said input and output sections; and, further wherein said transport is coupled between said input and output sections and said bin is configured to decrease size of said input section as mail is being processed and correspondingly increase size of said output section.

29. The system of claim 28, further comprising:

a first conveyor configured to selectively move mail from said input section to said transport; and a second conveyor configured to move mail from said transport to said output section.

30. A system for encoding mail, comprising:

a magazine configured to hold mail stacked on edge, said magazine including:

a input section for holding unprocessed mail, an output section for holding processed mail, a movable divider for adjusting the size of at least one of said input and output sections;

a transport device for selectively moving mail from said input section and to said output section;

a processing station coupled to said transport to receive a mail piece from said input section, said processing station being configured to present the mail piece for view by an operator and including a data entry device for entry by the operator of data associated with the mail piece;

a coding device disposed along said transport device to place a routing code on the mail piece corresponding to the address; and, wherein said bin is configured to decrease size of said input section as mail is being processed and correspondingly increases size of said output section.

31. The system of claim 30, wherein said station includes:

a movable display presenting the mail piece and at least one other mail piece to the operator at a first nonzero speed;

a controller operatively coupled to said controllable display, said data entry device, and said coding device, said controller including:

a data signal corresponding to data entered with said data entry device, a routing code signal determined in accordance with said data signal;

a first performance signal corresponding to data entry capability of the operator, and, wherein said controller changes speed of said display to a second nonzero speed as a function of said first performance signal, and said coding device places a routing code on the mail piece in response to said routing code signal.

32. The system of claim 30, wherein said transport device includes a feeder configured to feed a leading mail piece from said magazine, said feeder including:

(a) an endless turning belt with a moving contact face adapted to frictionally engage the leading mail piece;

(b) a pivotable arm configured to bear against the row in a hold position to hold the leading mail piece away from said face and to selectively pivot to a feed position behind said face to facilitate feeding of the leading mail piece by said belt; and (c) a controllable actuator configured to selectively move said arm between the hold and feed positions.

33. The system of claim 32, wherein said transport device further includes:

a roller positioned opposite said face to define a feed gap therebetween, said roller turning in the same rotational direction as said belt to discourage transport of multiple mail pieces; and a conveyor with a nip aligned with said feed gap to receive the leading mail piece after transport by said belt.

34. A mail feeder system, comprising:

a magazine for holding a row of mail stacked on edge;

a feeder configured to feed a mail piece leading the row, the feeder including:

an endless turning belt with a moving contact face adapted to frictionally engage the mail piece for transport away from the row;

a pivotable arm configured to bear against the row in a hold position to hold the mail piece away from the face and to selectively pivot to a feed position behind the face to facilitate feeding of the mail piece by the belt;

a controllable actuator configured to selectively move the arm between the hold and feed positions;

a roller positioned opposite the face to define a feed gap therebetween, the roller turning in the same rotational direction as the belt to discourage transport of multiple mail pieces;

a conveyor with a nip aligned with the feed gap to receive the mail piece after transport by the belt;

a first sensor to provide a detection signal corresponding to the presence of the leading piece at the conveyor; and a controller coupled to the actuator and the first sensor, the controller being responsive to a feed signal to move the arm to the feed position, the controller being responsive to the detection signal to move the arm from the feed position to the hold position.

35. The system of claim 34, further comprising a second sensor and a magazine drive coupled to the controller, the second sensor being configured to provide a pressure signal corresponding to pressure exerted on the arm in the hold position by the row, the controller providing an adjustment signal to the magazine drive in response to the pressure signal.

36. The system of claim 34, wherein said conveyor includes a pair of pinch rollers.

37. A method of mail encoding, comprising:

(a) simultaneously displaying a number of mail pieces at a first nonzero rate of speed, the mail pieces including a first mail piece and a second mail piece;

(b) entering into a processor at a first data entry rate a first number of characters appearing on the first mail piece without entering more characters than needed for the processor to determine a first routing code for the first mail piece;

(c) entering into the processor at a second data entry rate a second number of characters appearing on the second mail piece without entering more characters from the second mail piece than needed for the processor to determine a second routing code for the second mail piece, the second number of characters being different from the first number of characters in quantity; and (d) changing the first nonzero rate to a second nonzero rate as a function of the first and second data entry rates.

38. The method of claim 37, further comprising printing a barcode on the first mail piece corresponding to the first routing code.

39. The method of claim 37, wherein the function includes an average data entry rate.

40. The method of claim 37, further comprising:

(e) routing the first and second mail pieces one at a time from a bin with a powered transport;

(f) placing a barcode on the first mail piece corresponding to the first routing code; and (g) returning the first mail piece to the bin with the transport.

41. The method of claim 37, wherein character entry is performed with a keyboard coupled to the processor, and the first number of characters includes a ZIP code, a street number, and at least part of a street name.

42. The method of claim 37, further comprising audibly prompting an operator during performance of said entering into the processor the second number of characters.

43. The method of claim 16, further comprising the steps of:

(4) entering a portion of an address of a second mail piece into a processor after step (3), the portion being sufficient to assign a routing code to the second mail piece and including only a part of the street name; and, (5) changing the second nonzero speed to a third nonzero speed as a function of the position of the second mail piece during performance of step (4).

44. The system of claim 31, wherein said controller includes a second performance signal corresponding to the data entry capability of the operator and changes the second nonzero speed to a third nonzero speed as a function of the second performance signal.

45. The method of claim 37 further comprising the steps of:

(e) entering into the processor at a third data entry rate a third number of characters appearing on the third mail piece without entering more characters from the third mail piece than needed for the processor to determine a third routing code for the third mail piece, the third number of characters being different from the second number of characters in quantity; and, (f) changing the second nonzero rate to a third nonzero rate as a function of the third data entry rate.

* * * * *